Aug. 2, 1927.  C. L. STEWART  1,637,880
RIM FOR AUTOMOBILE WHEELS
Filed Jan. 21, 1926
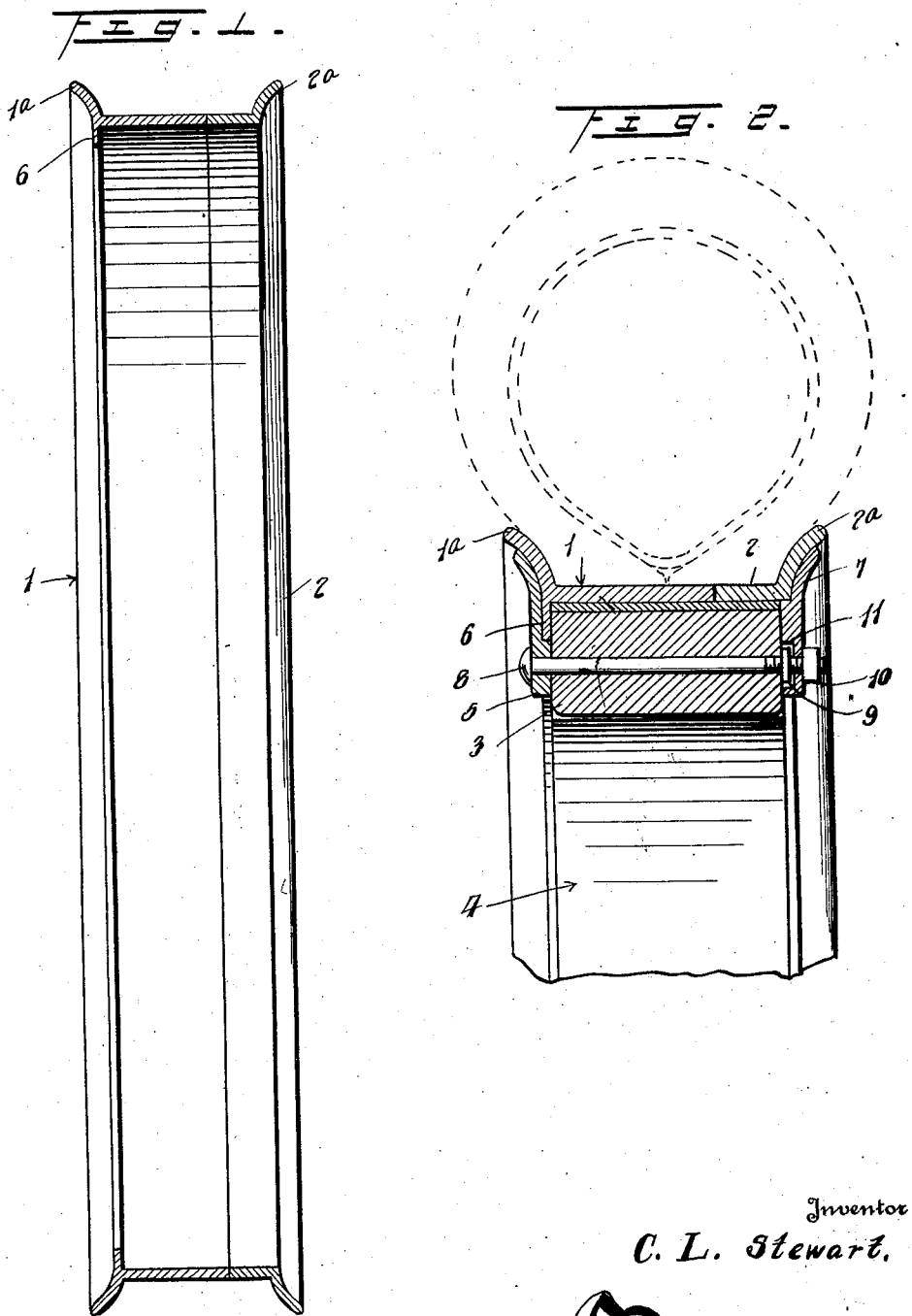
Inventor
C. L. Stewart, Patented Aug. 2, 1927.

1,637,880

UNITED STATES PATENT OFFICE.

CHARLES L. STEWART, OF JACKSONVILLE, ALABAMA.

RIM FOR AUTOMOBILE WHEELS.

Application filed January 21, 1926. Serial No. 82,773.

This invention relates to tire carrying rims for automobile wheels, and has for one of its objects the provision of a device of this character which shall embody two sections of which one shall be adapted to permanently remain on the wheel and the other of which shall be readily removable to permit a punctured or otherwise damaged tire to be easily and quickly removed and the repaired or a new tire replaced on and secured to the wheel.

A further object of the invention is the provision of novel and simple means for permanently securing one of the rim sections and removably securing the other to the wheel.

With the foregoing and other objects in view, the invention consists of the novel construction, combination and arrangement of parts hereinafter fully described and claimed, and illustrated in the accompanying drawing, wherein:

Figure 1 is a sectional view taken on a plane extending vertically and centrally through a tire carrying rim constructed in accordance with my invention, and Figure 2 is a sectional view illustrating the application of the tire carrying rim to a wheel and the means for securing the rim in place.

The tire carrying rim comprises two sections 1 and 2 which are adapted to be mounted on the felly 3 of a wheel 4 with their adjacent edges in contact, and are provided at their remote edges with flanges 1ª and 2ª, respectively, adapted to contact with the sides of a tire. Inner lugs 5 and a shoulder or flange 6 on the inner section 1 and contacting with the inner side of the felly 3, are employed to permanently secure said section in place, and outer lugs 7 are employed to removably secure the outer section 2 to the rim. The lugs 5 are secured to the rim 3 by bolts 8 and nuts 9. The bolts 8 pass through the lugs 5 and rim 3, and the nuts 9 are mounted on the bolts 8 for contact with the outer side of the felly 3. The lugs 7 are secured in place by the bolts 8 and nuts 10, and are provided in their inner sides with recesses 11 for the reception of the nuts 9. The nuts 10 are applied to the bolts 8 for contact with the outer sides of the lugs 7. The lugs 5 contact with the shoulder 6 and with the flange 1ª of the inner rim section 1, and the lugs 7 contact with the outer rim section 2 and with the flange 2ª thereof.

The construction of the rim and the manner in which it is secured to the wheel permit the tire to be readily removed in order to repair a puncture or other injury thereto or in order to replace it by a new tire. The removal of the nuts 10 from the bolts 8 permits the lugs 7 to be removed, and after the removal of these lugs the section 2 and tire may be easily pulled off of the wheel. The shoulder or flange 6 prevents the section 1 from being pulled off of the wheel during the removal therefrom of the section 2 and the tire. The lugs 5, bolts 8 and nuts 9 prevent the displacement of the section 1, during the application of the tire to the wheel, and the recesses 11 in the lugs 7 permits the latter to be held in full abutting contact with the rim 3 and flange 2ª by the nuts 10. The rim may be made for use in connection with tires of the clincher or straight side type and may be made of sheet steel or other suitable material.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

We wish to use plain or lock nuts and more than specified number of bolts and lugs to bolt rims to different make of machines and trucks where necessary.

What is claimed is:—

In combination, a wheel, a rim embodying inner and outer sections resting on the felly of the wheel with their adjacent edges contacting with each other, said rim sections being provided at their remote edges with tire retaining flanges and said inner rim section being provided with an annular shoulder contacting with the inner side of the felly, inner lugs contacting with the felly and with the shoulder and flange of the inner rim section, bolts passing through the lugs and felly, nuts mounted on the bolts and contacting with the outer side of the felly, outer lugs mounted on the bolts and contacting with the outer rim section and with the flange thereof, said outer lugs being provided in their inner sides with recesses for the reception of the nuts, and other nuts mounted on the bolts and contacting with the outer sides of the outer lugs.

In testimony whereof I affix my signature.

CHARLES L. STEWART.